United States Patent [19]
Hahn

[11] 3,765,951
[45] Oct. 16, 1973

[54] METHOD OF SEALING A COVER TO A BATTERY

[76] Inventor: Laurence W. Hahn, 8513 Temple Park Drive, Tampa, Fla.

[22] Filed: May 24, 1971

[21] Appl. No.: 146,514

Related U.S. Application Data

[62] Division of Ser. No. 784,316, Dec. 17, 1968, Pat. No. 3,629,010.

[52] U.S. Cl. .................. 136/176, 156/69, 264/261, 264/263
[51] Int. Cl. ............................................. H01m 1/02
[58] Field of Search .......................... 136/170, 176; 156/69; 53/38; 264/261, 263

[56] References Cited
UNITED STATES PATENTS

| | | | |
|---|---|---|---|
| 3,194,867 | 7/1965 | Shannon | 136/170 |
| 3,259,525 | 7/1966 | Wilson | 136/176 |
| 3,416,970 | 12/1968 | Sabatino | 136/170 |
| 3,449,170 | 6/1969 | Thornblad et al. | 136/176 |

*Primary Examiner*—Donald L. Walton
*Attorney*—Stefan M. Stein

[57] ABSTRACT

An apparatus and method for sealing a battery cover to an assembled battery comprising the steps of inverting the battery on a platform, separately gripping the cover and container of the battery with vacuum pads, exposing the inside of the cover by simultaneously lowering the platform and vacuum pads attached to the cover, coating the cover with a sealant material by dispensing the sealant through nozzles which pivot into communication with the cover, reuniting the cover to the container, and curing the sealant.

3 Claims, 8 Drawing Figures

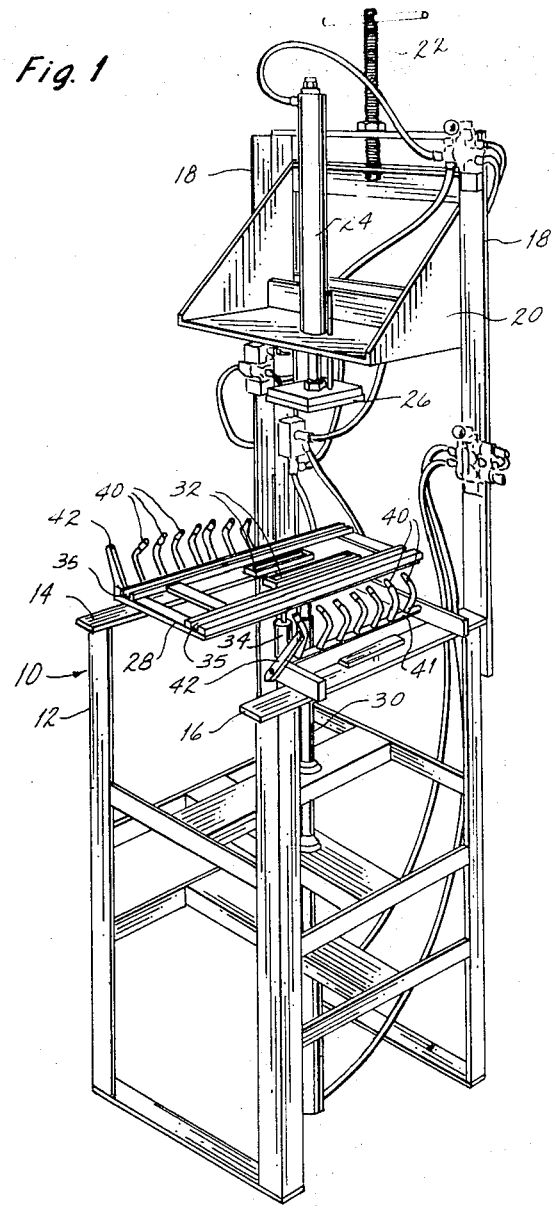

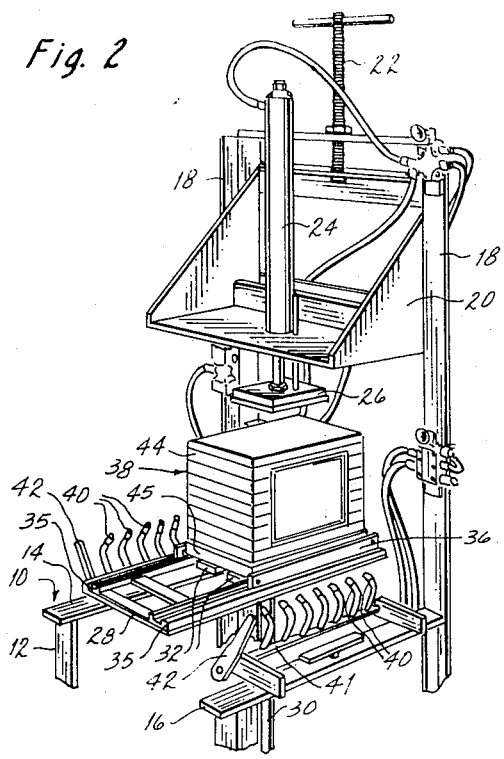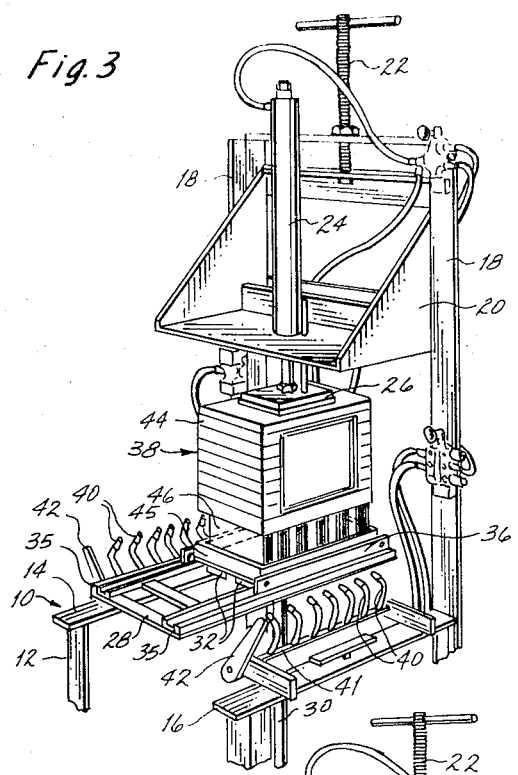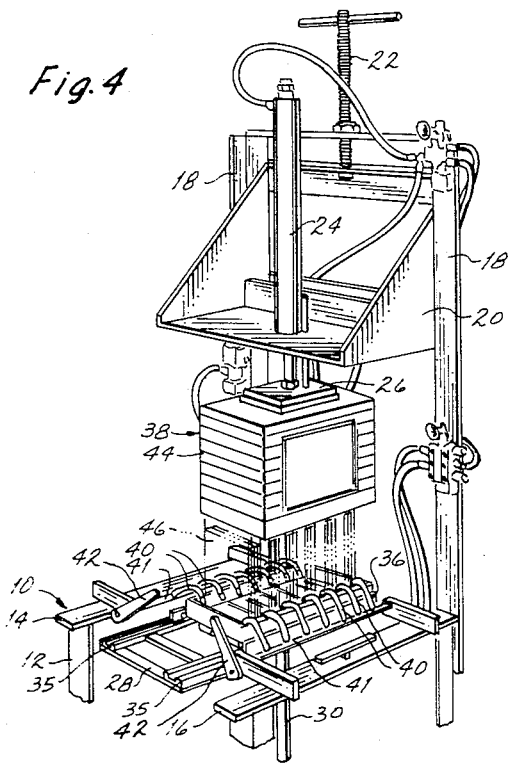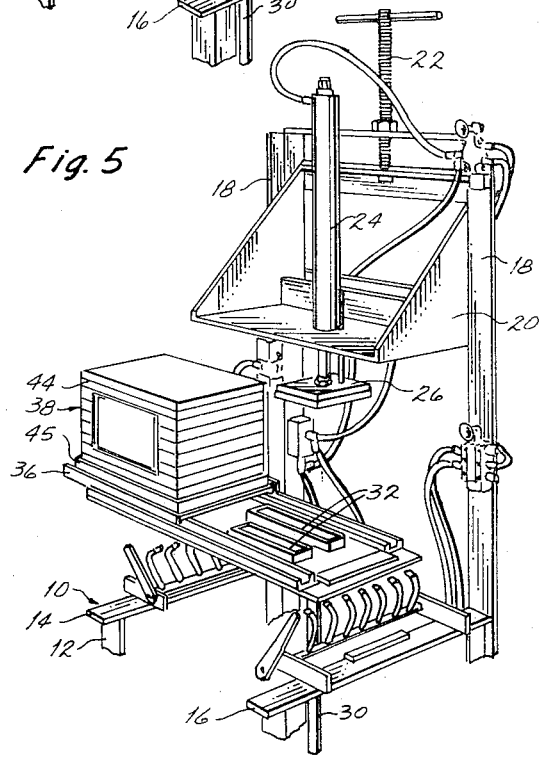

3,765,951

METHOD OF SEALING A COVER TO A BATTERY

This application is a division of application Ser. No. 784,316, filed Dec. 17, 1968, now Pat. No. 3,629,010.

This invention relates to a method and apparatus for sealing battery covers; more particularly, this invention relates to a method and apparatus for sealing a battery cover in an assembly of storage batteries.

In assembling storage batteries with known apparatus and methods, usually the internal elements of the battery are first connected to internal terminal posts and then installed in the battery's container. After the internal elements are installed an operator manually coats sealant material recesses on the inside of the battery's cover with a sealant and afterwards seals the cover to the container. External terminal posts are then fused to the internal terminal posts. This has a number of disadvantages making the known methods and apparatus unsuitable for mass production of batteries.

One major disadvantage is that the external terminal posts are fused to internal terminal posts after the cover is sealed to the container rather than being made in one integral unit. This extra fusing step is unnecessary and only results because no effective method or apparatus has been devised which can separate the battery cover with the internal elements attached from the battery container, and then seal the cover to the container after it is coated. Obviously, with internal elements attached, the battery cover is heavy and cumbersome to handle when being coated with a sealant. Because of this, it has been easier to coat the cover, seat it to the container, then afterwards connect the cover to the internal elements by fusing the external terminal posts to the internal terminal posts. This fusing step involves more time adding to the manufacturing cost of the battery. Another disadvantage is that the cover is coated with the sealant material by hand or by other methods and apparatus which make it an unduly time consuming task which further increases the cost of the battery's manufacture. Moreover, known methods and apparatus for sealing a battery cover to a battery container do not lend themselves to an automated assembly of batteries.

Accordingly, it is an object of this invention to provide a novel method and apparatus for sealing a battery cover to a battery container.

Another object is to provide a novel method and apparatus for separating and uniting a battery cover and its internal elements to a battery container.

Still another object is to provide a novel method and apparatus for coating a battery cover with a sealant material.

A further object is to provide a method and apparatus for assembling a battery which eliminates the step of fusing external terminal posts to internal terminal posts after the battery cover is sealed. A still further object is to provide a novel method and apparatus for automatically sealing a battery cover to a battery container.

Another object is to provide an apparatus and method for sealing a battery cover to a battery container which is expedient and simple.

Another object is to provide an apparatus for sealing a battery cover to a battery container which is practical and economically feasible to manufacture.

Other objects of the invention will in part be obvious and will in part appear hereinafter.

According to these objects the invention comprises a method and apparatus for separating a battery cover and internal battery elements from a battery container, coating the inside of the cover with a sealant material, and then reuniting and sealing the battery cover with the internal elements to the battery container. This is accomplished in the following manner. An assembled battery, having its cover preheated to approximately 200° F., is inverted on a pallet which is in turn carried on a vertically adjustable platform. The cover, together with the internal elements of the battery, is then separated from the container to expose the inside of the cover so that it can be coated with a sealant material. To separate the cover, vacuum pads are suitably placed to individually grip the container and cover. After a vacuum source is applied to the vacuum pads, the platform and vacuum pads which are attached to the cover are lowered simultaneously to withdraw and expose the cover. When the cover is exposed, sealant dispensing nozzles are pivoted into position adjacent sealant receiving grooves along the inside edge of the cover. A sealant is then dispensed through the nozzles to coat the grooves. After the grooves are coated, the dispensing nozzles pivot away from the cover, and the platform is raised until the cover is once again united with the battery container. The suction pads are then released from the battery, and the battery is transported to a curing oven for bonding the cover to the container or to a curing room if the sealant is to be cured at room temperature.

The invention accordingly comprises the feature of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of the apparatus of the invention.

FIGS. 2, 3, 4, and 5 are perspective views of the invention showing a sequential operation of the apparatus in separating a battery cover from a battery container, coating the inside of the cover with a sealant material, and reuniting the cover with the container.

Similar reference characters refer to similar parts throughout the several views of the drawings.

Figure 6:
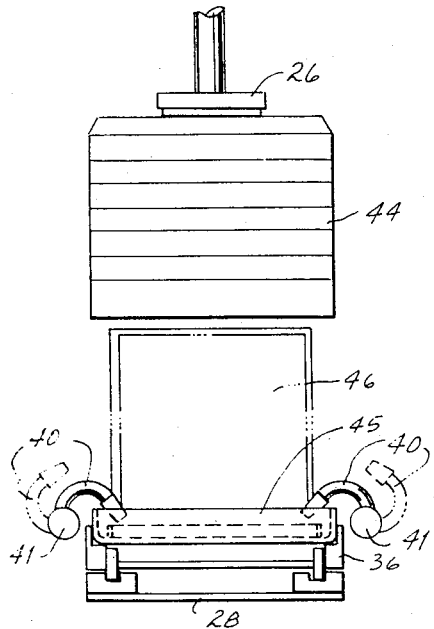
FIG. 6 is an end view of the battery cover and internal elements of the battery showing the manner in which the sealant material is applied to the battery cover.

Referring now to the drawings in detail, and particularly FIG. 1, the work station for separating a battery cover from its container, coating the cover, and reuniting the cover with its container is generally designated as 10. The work station includes work stand 12, only a part of which is shown, with support arms 14 and 16 forming a platform receiving opening between them. Attached to one end of support arms 14 and 16 is an upper extension 18 supporting a bracket 20 that generally extends horizontally over the above mentioned opening. This bracket is slidably received within extensions 18 and is vertically adjustable by screw 22. Carried on the bracket is a pneumatic cylinder 24 and associated vacuum pad 26.

A battery platform 28, vertically adjustable by a pneumatically operated elevating post 30, is received within the platform opening between arms 14 and 16. The pneumatic elevating post 30 moves the platform between a raised first position and a lowered secton position. The platform 28 is also rotatably mounted on post 30 such that it can be manually rotated 90°. Carried by the platform are a pair of vacuum pads 32 for engaging a cover of a battery. These vacuum pads are raised and lowered by pneumatic cylinder 34 to contact the cover and are in communication with a vacuum source, not shown, to grip the cover. The platform also carries along its outer edges a pair of grooved rails 35 for receiving a pallet 36 for transporting a battery 38.

Suitably positioned on each support arm 14 and 16 are pivotable dispensing nozzles 40 for dispensing a sealant material into the battery cover. The nozzles are mounted on a manifold 41 which is in communication with a source of sealant material. The nozzles are pivoted approximately 90° from an inoperative to operative position by pivoting each manifold by a handle 42.

Operation of the apparatus can best be seen by following the sequential operation as shown in FIGS. 2 through 5. The battery is received at the work station after its cover is heated to approximately 200° F. to receive the sealant material. An operator places pallet 36 on platform 28, sets the battery upside down on the pallet, then positions the pallet underneath vacuum pad 26 as shown in FIG. 2. After the battery is in this position, pneumatic cylinder 24 lowers vacuum pad 26 into contact with the bottom surface of the battery's container 44. Simultaneously vacuum pads 32 are raised by pneumatic cylinder 34 to engage the battery's cover 45. After a vacuum source is applied to the vacuum pads to firmly grip the container and cover, pneumatic elevating post 30 lowers platform 28. As the platform is lowered, the battery cover along with the internal elements 46 of the battery are separated from the battery container. When the platform reaches its lowermost second position, as shown in FIG. 4, the inside cover is completely exposed. At this time, pivotal dispensing nozzles 40 are manually pivoted by handles 42 to a location adjacent the inside surface of the cover.

Figure 7:
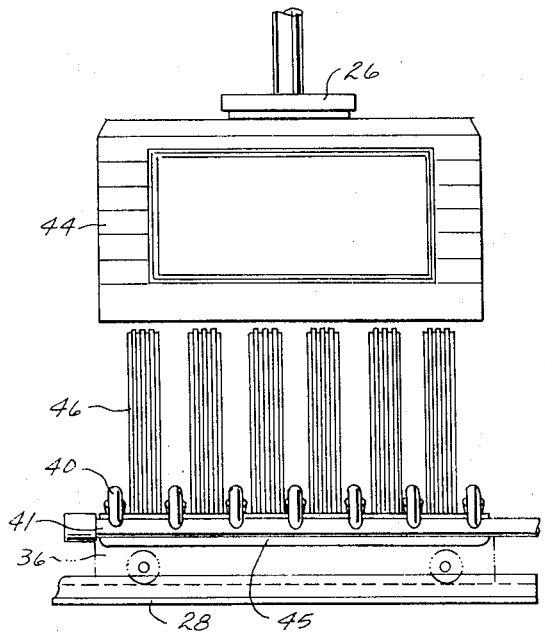
FIG. 7 is a side view of FIG. 6.
Figure 8:
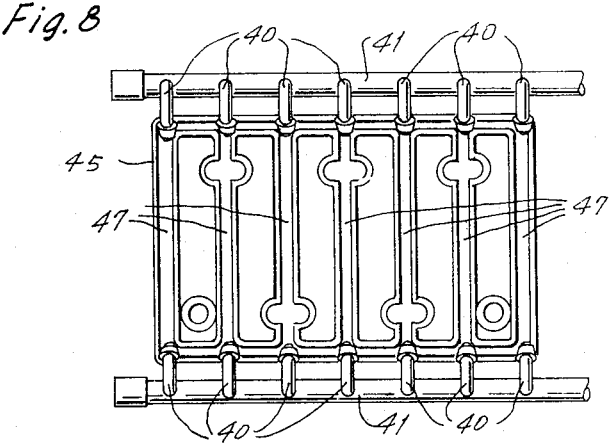
FIG. 8 is a top view of FIG. 6 showing particularly the recesses on the inside of the cover for receiving a sealant material.

The arrangement of dispensing nozzles 40 with battery cover 45 is more clearly shown in FIGS. 6, 7, and 8. The inside of the cover is conventionally formed with grooves or recesses 47 to receive a sealant material and to engage upstanding vertical walls or partitions of the battery container. Dispensing nozzles 40 are pivoted such that their tips are adjacent each intersection of the grooves as shown. When they are in this position, a low viscosity sealant is dispensed, whereupon it flows readily throughout the grooves of the heated cover. After the sealant material has been dispensed, the nozzles are pivoted 90° back to their inoperative or starting position.

Table 28 is then raised to its uppermost or first position, at which point the cover is reunited with the battery container. The vacuum pads are then released and withdrawn from contact with the battery. The platform 28 is then rotated 90° to the position shown in FIG. 5 and the pallet carrying the battery is removed from the platform and transferred by a conveyor to an oven for curing the battery or to a curing room if the battery is to be cured at room temperature.

It should now be evident from the above description that a novel method and apparatus has been devised for separating a battery cover and internal elements from the battery container, coating the inside of the cover with a sealant material, and then reuniting the battery cover and internal elements to the battery cover. The apparatus and the method enable the internal elements of the battery to be attached to the cover before the cover is sealed in place; thereby eliminating a previous extra step of fusing external terminal posts to the cover after the internal parts have been assembled and the cover is sealed. The manner in which the cover and container are separated is expedient and simple. Moreover, a manner has been devised to apply a sealant material to the cover which quickly and efficiently distributes the sealant throughout the cover within a short period of time. The apparatus itself may easily be adapted to automatically lower, coat and raise the cover in an automatic assembly of the battery, In addition, being very simple, the apparatus is both practical and economically feasible to manufacture.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described:

What is claimed is:

1. A method for sealing a battery cover to an assembled battery comprising the steps of heating the cover, inverting said battery, separating the cover with the internal elements of the battery from said battery container, applying a sealant material to the exposed cover, reuniting said cover to said battery container, and curing said sealant.

2. The method of claim 1 wherein the battery is separated from the cover by applying a vacuum attaching means to the battery and cover container, and separating the battery cover from the container by moving the vacuum attaching means relative to each other.

3. The method of claim 2, wherein the sealant material is applied by pivoting a number of dispensing nozzles adjacent sealant receiving grooves of said cover and dispensing the sealant material through said nozzles.

* * * * *